United States Patent
Feng et al.

(10) Patent No.: US 12,265,980 B2
(45) Date of Patent: Apr. 1, 2025

(54) USING A PREDICTIVE MODEL TO IDENTIFY CONTEXT FEATURES CAUSING ABOVE-AVERAGE TIP AMOUNT

(71) Applicant: Maplebear Inc., San Francisco, CA (US)

(72) Inventors: Shuo Feng, Issaquah, WA (US); Chia-Eng Chang, Campbell, CA (US); Aoshi Li, Toronto (CA); Pak Hong Wong, Vancouver (CA); Leo Kwan, Flushing, NY (US); Mengyu Zhang, Chestnut Hill, MA (US); Van Nguyen, Brooklyn, NY (US); Aman Jain, Barrie (CA); Ziwei Shi, San Francisco, CA (US); Ajay Pankaj Sampat, San Francisco, CA (US); Rucheng Xiao, Chicago, IL (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/240,798

(22) Filed: Aug. 31, 2023

(65) Prior Publication Data
US 2025/0078105 A1    Mar. 6, 2025

(51) Int. Cl.
*G06Q 30/0201*    (2023.01)
(52) U.S. Cl.
CPC ................. *G06Q 30/0206* (2013.01)
(58) Field of Classification Search
CPC .................................................. G06Q 30/0206
USPC ....................................................... 705/7.35
See application file for complete search history.

(56) References Cited

U.S. PATENT DOCUMENTS

| 11,030,535 B1* | 6/2021 | Arora ................. G06N 5/04 |
| 2014/0164151 A1* | 6/2014 | Hockley ............ G06Q 30/0283 |
| | | 705/15 |
| 2016/0042339 A1* | 2/2016 | Nichols .................. G06Q 20/12 |
| | | 705/35 |
| 2017/0345068 A1* | 11/2017 | Rosch ................ G06Q 30/0282 |
| 2019/0220838 A1* | 7/2019 | Olenoski ............. G06Q 20/405 |
| 2020/0273005 A1* | 8/2020 | Abrons .............. G06Q 20/3278 |

FOREIGN PATENT DOCUMENTS

WO    WO-2015191360 A1 * 12/2015 ........... G06Q 20/322

OTHER PUBLICATIONS

D. Elliott, M. Tomasini, M. Oliveira and R. Menezes, "Tippers and stiffers: An analysis of tipping behavior in taxi trips," 2017 IEEE SmartWorld, San Francisco, CA, USA, Jun. 2017, pp. 1-8. (Year: 2017).*

* cited by examiner

*Primary Examiner* — Jeff Zimmerman
*Assistant Examiner* — Hunter A Molnar
(74) *Attorney, Agent, or Firm* — Fenwick & West LLP

(57) ABSTRACT

An online system receives information describing an order placed by a user of the online system and a set of contextual features associated with servicing the order. The online system also retrieves a set of user features associated with the user. The online system accesses a machine learning model trained to predict a tip amount the user is likely to provide for servicing the order and applies the machine learning model to a set of inputs, in which the set of inputs includes the information describing the order, the set of user features, and the set of contextual features. The online system then determines a suggested tip amount for servicing the order based on the predicted tip amount.

14 Claims, 5 Drawing Sheets

USING A PREDICTIVE MODEL TO IDENTIFY CONTEXT FEATURES CAUSING ABOVE-AVERAGE TIP AMOUNT

BACKGROUND

Online systems, such as online concierge systems, allow customers to place online delivery orders and select delivery periods during which the orders are to be delivered. The orders are then matched with pickers who service the orders (e.g., by driving to retailer locations, collecting the orders, and delivering the orders to customers). When placing an order, a customer may provide a gratuity or tip to a picker servicing their order that is added to the basic price of the order (e.g., the total cost of the items in the order and any taxes or fees associated with the order). For example, a customer may specify a tip amount for an order they have placed that is a percentage (e.g., 5% or 10%) of the total cost of the order or a dollar amount (e.g., $3.00) that the customer will pay the picker in return for servicing their order. Customers generally provide tips in amounts that are proportional to the amount of effort required to service the orders. For example, customers usually provide larger tip amounts for servicing larger orders, for traveling longer distances to deliver orders, for delivering orders in adverse weather conditions, etc. than for servicing smaller orders, for traveling shorter distances to deliver orders, for delivering orders in good weather conditions, etc.

However, for various reasons, customers may fail to provide tip amounts that pickers would deem sufficient. For example, a customer who is unfamiliar with tipping etiquette may not leave a tip or may provide a smaller tip amount than a picker would expect to receive. As an additional example, a customer who is distracted or in a hurry when placing an order may not consider how much effort may be required to service their order and may not provide a tip amount that a picker servicing their order would think is adequate. Since pickers may rely on tips as income, the failure of customers to provide sufficient tip amounts may cause disgruntled pickers to reduce their availability for servicing orders or even discontinue servicing orders, which may negatively impact the ability of online systems to deliver orders on time.

SUMMARY

In accordance with one or more aspects of the disclosure, an online system determines a suggested tip amount for servicing an order placed with the online system. More specifically, an online system receives information describing an order placed by a user of the online system and a set of contextual features associated with servicing the order and retrieves a set of user features associated with the user. The online system accesses a machine learning model trained to predict a tip amount the user is likely to provide for servicing the order and applies the model to a set of inputs, in which the set of inputs includes the information describing the order, the set of user features, and the set of contextual features. The online system then determines a suggested tip amount for servicing the order based on the predicted tip amount.

DETAILED DESCRIPTION

Figure 1:
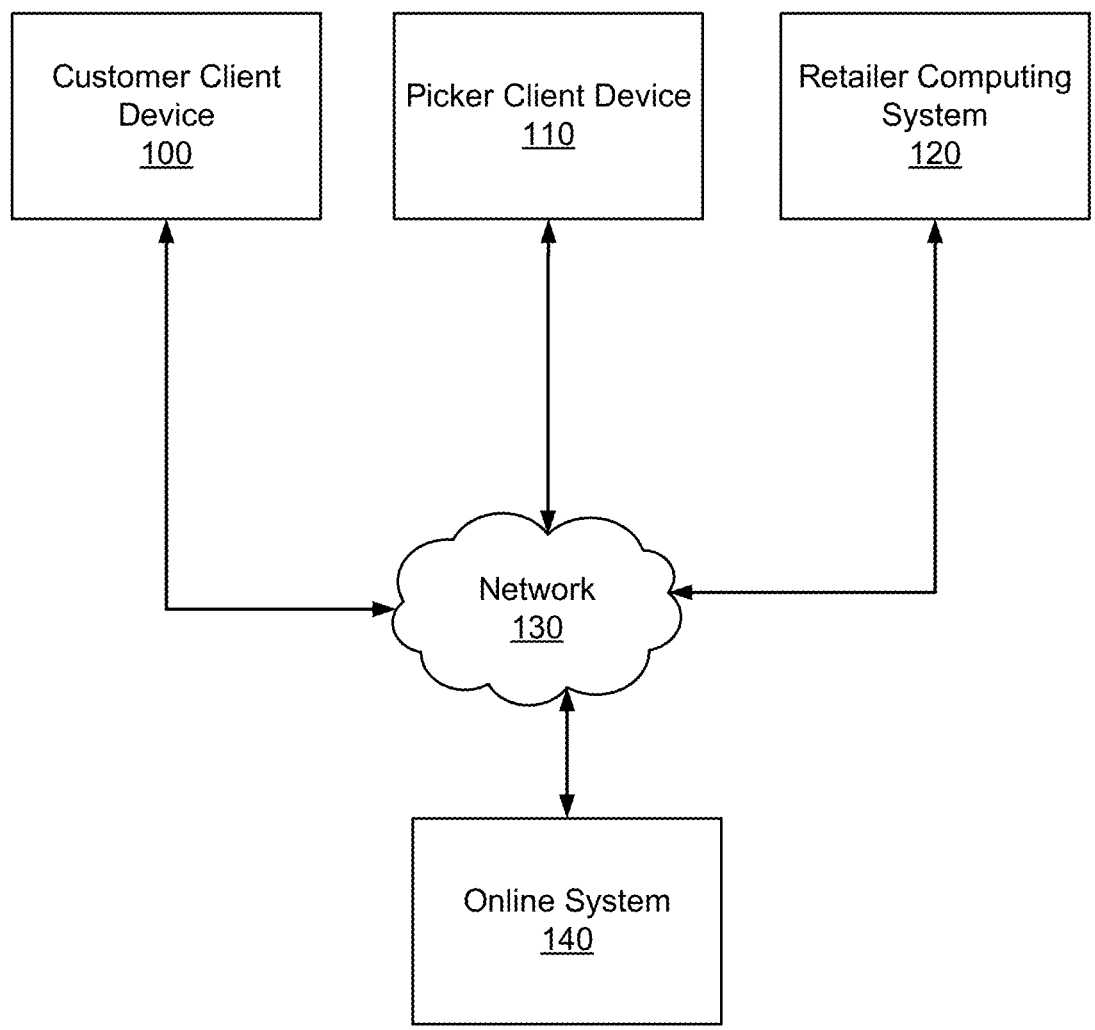
FIG. 1 illustrates an example system environment for an online system, in accordance with one or more embodiments.

FIG. 1 illustrates an example system environment for an online system 140, such as an online concierge system, in accordance with one or more embodiments. The system environment illustrated in FIG. 1 includes a customer client device 100, a picker client device 110, a retailer computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online system 140. Additionally, while one customer client device 100, picker client device 110, and retailer computing system 120 are illustrated in FIG. 1, any number of customers, pickers, and retailers may interact with the online system 140. As such, there may be more than one customer client device 100, picker client device 110, or retailer computing system 120.

The customer client device 100 is a client device through which a customer may interact with the picker client device 110, the retailer computing system 120, or the online system 140. The customer client device 100 can be a personal or mobile computing device, such as a smartphone, a tablet, a laptop computer, or a desktop computer. In some embodiments, the customer client device 100 executes a client application that uses an application programming interface (API) to communicate with the online system 140.

A customer uses the customer client device 100 to place an order with the online system 140. An order specifies a set of items to be delivered to the customer. An "item," as used herein, refers to a good or product that may be provided to the customer through the online system 140. The order may include item identifiers (e.g., a stock keeping unit or a price look-up code) for items to be delivered to the customer and may include quantities of the items to be delivered. Additionally, an order may further include a delivery location to which the ordered items are to be delivered and a period during which the items should be delivered. In some embodiments, the order also specifies one or more retailers from which the ordered items should be collected.

The customer client device 100 presents an ordering interface to the customer. The ordering interface is a user interface that the customer can use to place an order with the online system 140. The ordering interface may be part of a client application operating on the customer client device 100. The ordering interface allows the customer to search for items that are available through the online system 140 and the customer can select which items to add to a "shopping list." A "shopping list," as used herein, is a tentative set of items that the customer has selected for an order but that has not yet been finalized for an order. The ordering interface allows a customer to update the shopping list, e.g., by changing the quantity of items, adding or removing items, or adding instructions for items that specify how the items should be collected.

The customer client device 100 may receive additional content from the online system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the customer to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer location. The picker client device 110 presents the items that are included in the customer's order to the picker in a collection interface. The collection interface is a user interface that provides information to the picker identifying items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 provides instructions to a picker for delivering the items for a customer's order. For example, the picker client device 110 displays a delivery location from the order to the picker. The picker client device 110 also provides navigation instructions for the picker to travel from the retailer location to the delivery location. If a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the customer client device 100 for display to the customer such that the customer can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140. Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 may provide item data indicating which items are available at a retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a customer's order (e.g., as a commission).

The customer client device 100, the picker client device 110, the retailer computing system 120, and the online system 140 may communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 may be an online concierge system by which customers can order items to be provided to them by a picker from a retailer. The online system 140 receives orders from a customer client device 100 through the network 130. The online system 140 selects a picker to service the customer's order and transmits the order to a picker client device 110 associated with the picker. The picker collects the ordered items from a retailer location and delivers the ordered items to the customer. The online system 140 may charge a customer for the order and provide portions of the payment from the customer to the picker and the retailer. As an example, the online system 140 may allow a customer to order groceries from a grocery store retailer. The customer's order may specify which groceries they want delivered from the grocery store and the quantities of each of the groceries. The customer client device 100 transmits the customer's order to the online system 140 and the online system 140 selects a picker to travel to the grocery store retailer location to collect the groceries ordered by the customer. Once the picker has collected the groceries ordered by the customer, the picker delivers the groceries to a location transmitted to the picker client device 110 by the online system 140. The online system 140 is described in further detail below with regards to FIG. 2.

Figure 2:
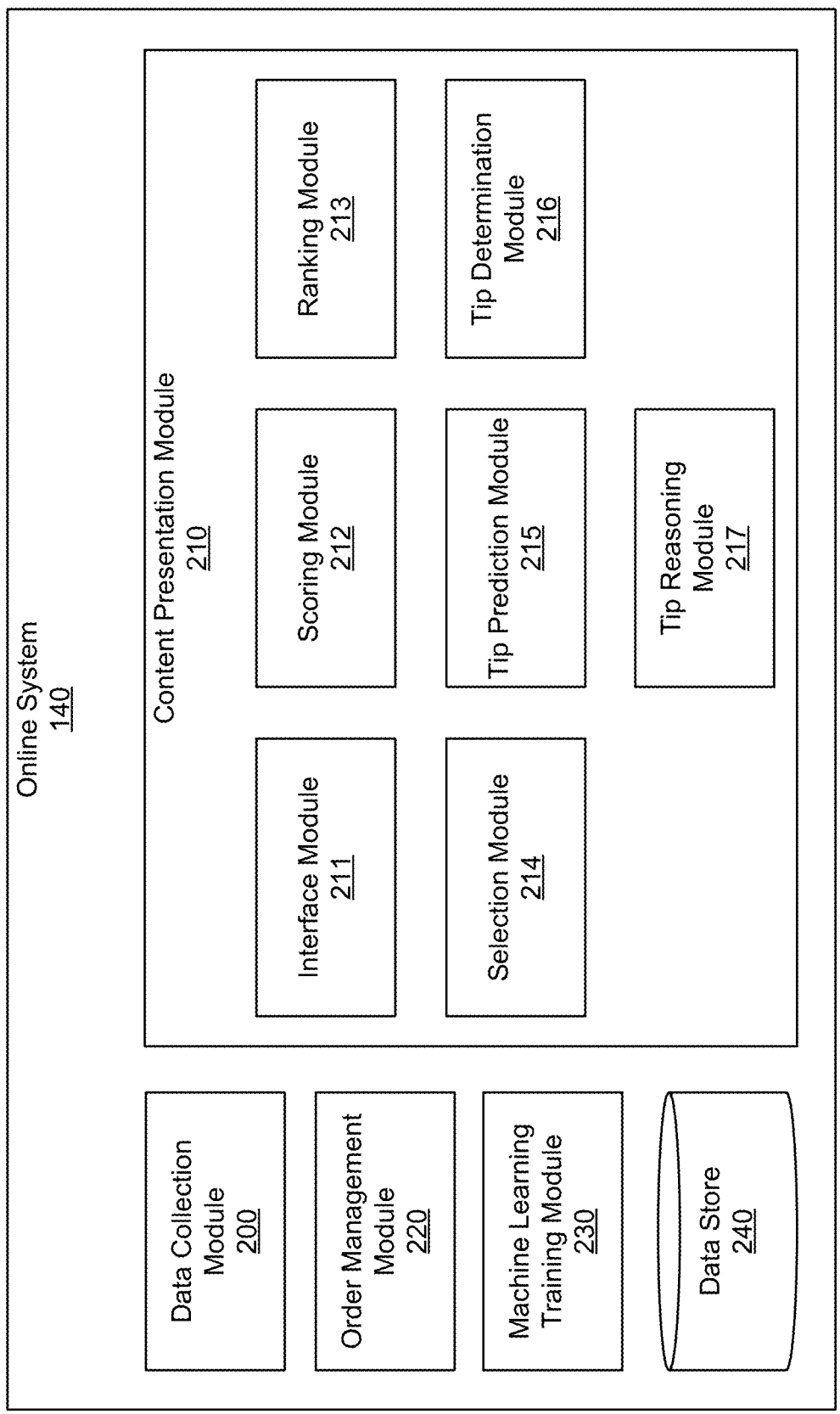
FIG. 2 illustrates an example system architecture for an online system, in accordance with one or more embodiments.

FIG. 2 illustrates an example system architecture for an online system 140, such as an online concierge system, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

The data collection module 200 collects customer data, which is information or data describing characteristics or other types of information associated with a customer. Customer data may include a customer's name, address, shopping preferences, favorite items, or stored payment instruments. Customer data also may include an age of a customer's account with the online system 140. The customer data also may include default settings established by a customer, such as a default retailer/retailer location, payment instrument, delivery location, or delivery period. Customer data also may include historical information associated with a customer describing one or more orders previously placed by the customer with the online system 140. Historical information associated with a customer may describe a tip amount provided by the customer for a previous order or an amount by which the customer adjusted a suggested tip amount for a previous order. Furthermore, historical information associated with a customer also may include any comments, feedback, responses to surveys/questionnaires, etc. associated with a previous order provided by a customer (e.g., one or more reasons provided by the customer for providing a tip amount or adjusting a suggested tip amount for the order). Historical information associated with a customer also may describe a number of orders previously placed by the customer, a frequency with which the customer places orders, a distribution of sizes of orders previously placed by the customer, information describing items included in orders previously placed by the customer, or any other suitable types of information. The data collection module 200 may collect the customer data from sensors on the customer client device 100 or based on a customer's interactions with the online system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the sizes, colors, weights, stock keeping units (SKUs), serial numbers, prices, item categories, brands, qualities (e.g., freshness, ripeness, etc.), ingredients, materials, manufacturing locations, versions/varieties, or any other suitable attributes of the items. The item data may further include purchasing rules associated with each item, if they exist. For example, age-restricted items such as alcohol and tobacco are flagged accordingly in the item data. Item data may also include information that is useful for predicting the availability of items at retailer locations. For example, for each item-retailer combination (a particular item at a particular retailer location), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or a customer client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data describing characteristics of pickers. For example, the picker data for a picker may include the picker's name, the picker's location, how often the picker has serviced orders for the online system 140, a customer rating for the picker, the retailers from which the picker has collected items, or the picker's previous shopping history. Additionally, the picker data may include preferences expressed by the picker, such as their preferred retailers for collecting items, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data describing characteristics of an order. For example, order data may include item data for items that are included in the order, a size of the order (e.g., a number of items included in the order), a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. Order data also may include various types of information describing an amount of effort required to service an order, which may be determined by the data collection module 200 based on other types of information stored in the data store 240. Examples of such types of information include: a travel distance associated with servicing the order (e.g., between a retailer location from which items included in the order were collected and a delivery location for the order), a number of flights of stairs a picker was required to climb, heavy or bulky items the picker was required to carry, fees associated with servicing the order (e.g., for parking or tolls), etc. Additionally, order data may include one or more contextual features associated with servicing an order. Contextual features associated with servicing an order may describe various circumstances or conditions that may affect a tip amount a customer provides for servicing an order. Examples of contextual features associated with servicing an order include: a weather event (e.g., heavy rain or snow) in which the order is serviced, a traffic event (e.g., heavy traffic, a road closure, etc.) along a route for servicing the order, a holiday (e.g., Christmas) during which the order is serviced, or any other suitable features. The data collection module 200 may collect order data from sensors of the customer client device 100 or the picker client device 110, from the picker's interactions with the online system 140, from a third-party system (e.g., a third-party weather, traffic, or calendar application), or any other suitable source.

The content presentation module 210 selects content for presentation to a customer. For example, the content presentation module 210 selects which items to present to a customer while the customer is placing an order. Components of the content presentation module 210 include: an interface module 211, a scoring module 212, a ranking module 213, a selection module 214, a tip prediction module 215, a tip determination module 216, and a tip reasoning module 217, which are further described below.

The interface module 211 generates and transmits an ordering interface for a customer to order items. The interface module 211 populates the ordering interface with items that the customer may select for adding to their order. In some embodiments, the interface module 211 presents a catalog of all items that are available to the customer, which the customer can browse to select items to order. Other components of the content presentation module 210 may identify items that the customer is most likely to order and the interface module 211 may then present those items to the customer. For example, the scoring module 212 may score items and the ranking module 213 may rank the items based on their scores. In this example, the selection module 214 may select items with scores that exceed some threshold (e.g., the top n items or the p percentile of items) and the interface module 211 then displays the selected items. The interface module 211 also may generate and transmit an interface including other types of content, as further described below.

The scoring module 212 may use an item selection model to score items for presentation to a customer. An item selection model is a machine learning model that is trained to score items for a customer based on item data for the items and customer data for the customer. For example, the item selection model may be trained to determine a likelihood that the customer will order an item. In some embodiments, the item selection model uses item embeddings describing items and customer embeddings describing customers to score items. These item embeddings and customer embeddings may be generated by separate machine learning models and may be stored in the data store 240.

In some embodiments, the scoring module 212 scores items based on a search query received from the customer client device 100. A search query is text for a word or set of words that indicate items of interest to the customer. The scoring module 212 scores items based on a relatedness of the items to the search query. For example, the scoring module 212 may apply natural language processing (NLP) techniques to the text in the search query to generate a search query representation (e.g., an embedding) that represents characteristics of the search query. The scoring module 212 may use the search query representation to score candidate items for presentation to a customer (e.g., by comparing a search query embedding to an item embedding).

In some embodiments, the scoring module 212 scores items based on a predicted availability of an item. The scoring module 212 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The scoring module 212 may weight the score for an item based on the predicted availability of the item. Alternatively, items may be filtered out from presentation to a customer based on whether the predicted availability of the item exceeds a threshold.

The tip prediction module 215 may interact with the data store 240 and retrieve various types of information. For example, the tip prediction module 215 may retrieve a set of customer features associated with a customer included among customer data stored in the data store 240. In this example, the set of customer features may include one or more tip amounts provided by the customer for one or more previous orders, one or more amounts by which the customer previously adjusted one or more suggested tip amounts, a number of orders previously placed by the customer with the online system 140, and an age of an account associated with the customer. In the above example, the set of customer features further may include a region associated with the customer (e.g., based on a delivery location or an address associated with the customer), a frequency with which the customer places orders with the online system 140, and a distribution of sizes of orders previously placed by the customer with the online system 140.

The tip prediction module 215 also predicts a tip amount a customer is likely to provide for servicing an order. The tip prediction module 215 may make the prediction based on various types of information, such as information describing the order, a set of customer features associated with the customer, a set of contextual features associated with servicing the order, or any other suitable types of information. For example, suppose that a set of customer features associated with a customer describes previous orders placed by the customer with the online system 140 that often included the same five items collected from a retailer location and a tip amount of $2.00 for these orders. In this example, suppose also that information describing a new order placed by the customer indicates that the new order includes the same five items to be collected from the same retailer location and that a set of contextual features associated with servicing the new order indicates that traffic conditions are light, the weather is mild, and it is not a holiday. In the above example, based on the information describing the new order, the set of customer features associated with the customer, and the set of contextual features associated with servicing the new order, the tip prediction module 215 may predict that the customer is likely to provide a tip amount of $2.00 for servicing the new order. Alternatively, in the above example, suppose that the set of contextual features associated with servicing the new order indicates that the weather is stormy and that the set of customer features indicates that the customer frequently provided an additional tip amount of $2.00 for previous orders that were serviced during stormy weather. In the above example, based on the information describing the new order, the set of customer features associated with the customer, and the set of contextual features associated with servicing the new order, the tip prediction module 215 may predict that the customer is likely to provide a tip amount of $4.00 for servicing the new order. In some embodiments, the tip prediction module 215 predicts multiple tip amounts a customer is likely to provide for servicing an order based on different types of information (e.g., by including or excluding one or more contextual features associated with servicing the order when making each prediction).

In some embodiments, the tip prediction module 215 predicts a tip amount a customer is likely to provide for servicing an order using a tip prediction model, which is a machine learning model (e.g., a neural network, a random forest model, etc.) trained to predict the tip amount. To use the tip prediction model, the tip prediction module 215 may access the model (e.g., from the data store 240) and apply the model to a set of inputs. The set of inputs may include various types of information described above that the tip prediction module 215 may use to predict the tip amount (e.g., information describing the order, a set of customer features associated with the customer, a set of contextual features associated with servicing the order, etc.). The tip prediction module 215 may then receive an output corresponding to the predicted tip amount that the customer is likely to provide for servicing the order. For example, the tip prediction module 215 may receive an output from the tip prediction model corresponding to a value (e.g., a percentage or a dollar value), in which the value describes a predicted tip amount that a customer is likely to provide for servicing an order. In some embodiments, rather than predicting a tip amount, the tip prediction model predicts a likelihood that a customer will provide a particular tip amount for servicing an order. In such embodiments, to use the tip prediction model, for each of multiple candidate tip amounts (e.g., 5%, 10%, 15%, etc.), the tip prediction module 215 applies the model to the set of inputs to predict a likelihood that the customer will provide a corresponding candidate tip amount for servicing the order. The tip prediction module 215 may then receive, for each candidate tip amount, an output corresponding to a value (e.g., a score or a percentage) indicating a predicted likelihood that the customer will provide the corresponding candidate tip amount for servicing the order. In some embodiments, the tip prediction model may be trained by the machine learning training module 230, as further described below.

The tip determination module 216 determines a suggested tip amount for servicing an order. The tip determination module 216 may do so based on a predicted tip amount a customer is likely to provide for servicing the order. For example, if the predicted tip amount a customer is likely to provide for servicing an order with a total cost of $34.96 is 5%, which is equivalent to $1.748, by rounding the tip amount to the nearest cent, the tip determination module 216 may determine the suggested tip amount for servicing the order to be $1.75. In embodiments in which the tip prediction module 215 predicts a likelihood that a customer will provide a particular tip amount for servicing an order for each of multiple candidate tip amounts, the tip determination module 216 identifies a candidate tip amount associated with a highest predicted likelihood and determines the suggested tip amount based on the identified candidate tip amount. For example, if candidate tip amounts of 5%, 10%, 15%, 20%, and 25% are associated with predicted likelihoods of 17%, 39%, 23%, 12%, and 9%, respectively, the tip determination module 216 may identify 10% as the candidate tip amount associated with the highest predicted likelihood and determine the suggested tip amount for servicing the order to be 10%.

The tip determination module 216 also may determine a suggested tip amount for servicing an order based on additional types of information. Examples of such types of information include: whether a coupon code was applied to the order, preset tip amounts (if any), or any other suitable types of information. For example, suppose that a customer applies a coupon code to their order, which decreases a total cost for the order. In this example, if the predicted tip amount the customer is likely to provide for servicing the order is 10%, the tip determination module 216 may determine the suggested tip amount based on the original total cost for the order, such that the tip amount is 10% of the original total cost. As an additional example, if the predicted tip amount a customer is likely to provide for servicing an order is 9.284%, the tip determination module 216 may identify a preset tip amount (e.g., 5%, 10%, 15%, 20%, etc.) closest to the predicted tip amount and determine the suggested tip amount for servicing the order to be the identified preset tip amount (e.g., 10%).

In embodiments in which the tip prediction module 215 predicts multiple tip amounts a customer is likely to provide for servicing an order, the tip determination module 216 also may determine an average tip amount the customer is likely to provide for servicing the order. The tip determination module 216 may do so based on a predicted tip amount the customer is likely to provide for servicing the order in a manner analogous to that described above for determining a suggested tip amount. An average tip amount a customer is likely to provide for servicing an order may differ from a suggested tip amount for servicing the order based on differences between one or more features (e.g., one or more contextual features associated with servicing the order) used to predict tip amounts on which the average and suggested tip amounts are based. For example, an average tip amount a customer is likely to provide for servicing an order may be smaller than a suggested tip amount for servicing the order if one or more contextual features associated with servicing the order (e.g., heavy rain or traffic, a holiday, etc.) used to predict a tip amount on which the suggested tip amount was based were not used to predict an additional tip amount on which the average tip amount was based. In embodiments in which a tip amount used to determine a suggested tip amount and an additional tip amount used to determine an average tip amount are predicted using the tip prediction model, to predict the additional tip amount, the model is applied to a subset of the set of inputs used to predict the tip amount. For example, suppose that to predict the tip amount used to determine the suggested tip amount, the tip prediction module 215 applies the tip prediction model to a set of inputs including information describing an order, a set of customer features associated with a customer, and a set of contextual features associated with servicing the order. In this example, to predict the additional tip amount used to determine the average tip amount, the tip prediction module 215 may apply the model to a subset of the set of inputs that excludes one or more contextual features included among the set of contextual features associated with servicing the order. Continuing with this example, the tip determination module 216 may then determine the average tip amount based on the predicted additional tip amount.

The tip reasoning module 217 may determine whether a suggested tip amount is larger than an average tip amount. Furthermore, in response to determining the suggested tip amount is larger, the tip reasoning module 217 also may determine one or more reasons the suggested tip amount is larger than the average tip amount. The tip reasoning module 217 may determine the reason(s) based on differences between one or more features (e.g., one or more contextual features associated with servicing the order) used to predict tip amounts on which the average and suggested tip amounts are based. For example, suppose that the tip reasoning module 217 compares a suggested tip amount with an average tip amount and determines that the suggested tip amount is larger than the average tip amount. In this example, if a contextual feature associated with servicing the order (e.g., a traffic event) was used to predict a tip amount on which the suggested tip amount was based, but was not used to predict an additional tip amount on which the average tip amount was based, the tip reasoning module 217 may determine that the contextual feature is a reason for the difference.

In some embodiments, the tip reasoning module 217 determines one or more reasons a suggested tip amount is larger than an average tip amount using a reason prediction model, which is a machine learning model trained to predict the reason(s). To use the reason prediction model, the tip reasoning module 217 may access the model (e.g., from the data store 240) and apply the model to a set of inputs. The set of inputs may include various types of information, such as information describing an order, a set of customer features associated with a customer, a set of contextual features associated with servicing the order, or any other suitable types of information. The tip reasoning module 217 may then receive one or more outputs indicating one or more reasons a suggested tip amount for servicing the order is larger than an average tip amount the customer is likely to provide for servicing the order (e.g., adverse weather conditions, a holiday, etc.). In some embodiments, the reason prediction model may be trained by the machine learning training module 230, as further described below.

Once the tip determination module 216 determines a suggested tip amount for servicing an order, the interface module 211 may generate a message including the suggested tip amount. The message also may include additional types of content, such as text describing one or more reasons the suggested tip amount is larger than an average tip amount the customer is likely to provide for servicing the order and additional tip amounts the customer may provide for servicing the order, one or more images, animations, or icons describing the reason(s), etc. The message also may include general information describing tips (e.g., when they may be added or reduced and a percentage that is paid to pickers), interactive elements (e.g., buttons) that allow the customer to modify or select a tip amount that is different from the suggested tip amount, to save a tip amount, to place an order including a selected tip amount, or any other suitable types of content. For example, the interface module 211 may generate a message including a suggested tip amount of 10% ($4.00), which is preselected with an indication that it is the suggested tip amount. In this example, the message also may include options to select additional tip amounts of 5% ($2.00), 15% ($6.00), 20% ($8.00), or another amount that a customer may specify upon selecting a radio button corresponding to that option. In the above example, the message also may include text describing a reason the suggested tip amount is larger than the average tip amount, such as stormy weather, and an image or an icon next to the suggested tip amount describing the reason. Continuing with the above example, the message also may include an interactive element, such as a button that allows a customer to save a selected tip amount or place an order including the selected tip amount. The interface module 211 may generate the message using generative artificial intelligence (AI) or using any other suitable technique or combination of techniques. In some embodiments, rather than generating the message, the interface module 211 selects the message from a set of preset messages stored in the data store 240.

In some embodiments, the interface module 211 may generate a message including a suggestion to increase a tip amount selected by a customer to a suggested tip amount. In such embodiments, the interface module 211 generates (or selects) the message in response to receiving a request from a customer client device 100 to provide a tip amount that is smaller than the suggested tip amount. Furthermore, the message may include one or more reasons for increasing the tip amount, which may correspond to one or more reasons the suggested tip amount is larger than the average tip amount determined by the tip reasoning module 217. For example, suppose that a customer has selected a tip amount of 5% ($2.00) for servicing an order and that a suggested tip amount for servicing the order is 10% ($4.00). In this example, in response to receiving a request from a customer client device 100 associated with the customer to place an order including the selected tip amount or to save the selected tip amount, the interface module 211 may generate a message including a suggestion to increase the tip amount selected by the customer (e.g., to the suggested tip amount of 10% ($4.00) or by $2.00) and one or more reasons for increasing the tip amount (e.g., it's a holiday and it's raining).

Once the interface module 211 generates (or selects) a message including a suggested tip amount or a suggestion to increase a tip amount selected by a customer to the suggested tip amount, it may send the message for display to a customer client device 100 associated with the customer. The interface module 211 subsequently may receive a response to the message from the customer client device 100. Information describing the response may be stored in the data store 240 by the data collection module 200. For example, once the interface module 211 generates a message including a suggested tip amount of 10% ($4.00) and sends it for display to a customer client device 100 associated with a customer, the interface module 211 subsequently may receive a response to the message from the customer client device 100 indicating whether the customer accepted or adjusted the suggested tip amount. In this example, in association with customer data for the customer, the data collection module 200 may store information describing whether the customer adjusted the suggested tip amount, and if so, an amount by which it was adjusted. Information describing the response also may be used to retrain the tip prediction model or to refine the tip prediction model (e.g., via reinforcement learning).

The order management module 220 manages orders for items from customers. The order management module 220 receives orders from customer client devices 100 and assigns the orders to pickers for service based on picker data. For example, the order management module 220 assigns an order to a picker based on the picker's location and the retailer location from which the ordered items are to be collected. The order management module 220 may also assign an order to a picker based on how many items are in the order, a vehicle operated by the picker, the delivery location, the picker's preferences for how far to travel to deliver an order, the picker's ratings by customers, or how often a picker agrees to service an order.

In some embodiments, the order management module 220 determines when to assign an order to a picker based on a delivery period requested by the customer who placed the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the period. Thus, when the order management module 220 receives an order, the order management module 220 may delay in assigning the order to a picker if the period is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit instructions to the picker client device 110 to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online system 140. The online system 140 may use machine learning models to perform functionalities described herein. Example machine learning models include regression models, support vector machines, naïve bayes, decision trees, k-nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model is used by the machine learning model to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In situations in which the training example includes a label, the loss function is also based on the label for the training example. Some example loss functions include the mean square error function, the mean absolute error, the hinge loss function, and the cross-entropy loss function. The machine learning training module 230 updates the set of parameters for the machine learning model based on the score generated by the loss function. For example, the machine learning training module 230 may apply gradient descent to update the set of parameters.

In embodiments in which the tip prediction module 215 accesses a tip prediction model that is trained to predict a tip amount a customer is likely to provide for servicing an order, the machine learning training module 230 may train the tip prediction model. The machine learning training module 230 may train the tip prediction model based on historical data describing tip amounts provided by customers for previous orders placed by the customers via any suitable technique or combination of techniques (e.g., supervised learning, unsupervised learning, or reinforcement learning). To illustrate an example of how the tip prediction model may be trained, suppose that the machine learning training module 230 receives a set of training examples. In this example, the set of training examples may include attributes of previous orders placed by customers, such as a travel distance associated with servicing each order, a size of each order, a set of contextual features (e.g., a weather or traffic event, a holiday, etc.) associated with servicing each order, etc. In the above example, the set of training examples also may include attributes of the customers, such as a number of orders previously placed by each customer, a region associated with each customer, an age of each customer's account with the online system 140, a frequency with which each customer places orders, a distribution of sizes of orders previously placed by each customer, etc. Continuing with this example, the machine learning training module 230 also may receive labels which represent expected outputs of the tip prediction model, in which a label indicates a previous tip amount provided by a customer for servicing an order. In the above example, the machine learning training module 230 may then train the tip prediction model based on the attributes, as well as the labels by comparing its output from input data of each training example to the label for the training example. In this example, the machine learning training module 230 also may refine the tip prediction model via reinforcement learning based on information received in response to messages including suggested tip amounts for servicing previous orders (e.g., whether customers accepted suggested tip amounts and amounts by which customers adjusted suggested tip amounts, if any).

In embodiments in which the machine learning training module 230 trains the tip prediction model, the machine learning training module 230 may address any cold start issues via a clustering algorithm that groups new and existing customers into one or more clusters (e.g., using customer embeddings or other representations of the customers), such that customers included in the same cluster share the same tipping behavior. For example, new and existing customers may be grouped via k-means clustering based on various customer features of the customers, such as a tip amount provided by each customer for a previous order, a number of orders previously placed by each customer, a region associated with each customer, an age of each customer's account with the online system 140, a distribution of sizes of orders previously placed by each customer, etc. In the above example, new customers may be grouped based on a region associated with each customer and regional averages (e.g., average tip amounts for previous orders provided by customers in the same region). Continuing with the above example, since customers included in the same cluster share the same tipping behavior, a different tip amount associated with each cluster may be determined (e.g., based on tip amounts previously provided by customers included in the cluster), in which the tip amount associated with a cluster indicates a tip amount a customer included in the cluster is likely to provide for servicing an order.

In embodiments in which the tip reasoning module 217 accesses a reason prediction model that is trained to predict one or more reasons a suggested tip amount for servicing an order is larger than an average tip amount a customer is likely to provide for servicing the order, the machine learning training module 230 may train the reason prediction model. The machine learning training module 230 may train the reason prediction model via supervised learning based on various types of data received by the data collection module 200 and stored in the data store 240, such as order data describing previous orders placed by customers, customer data describing the customers, or any other suitable types of information. To illustrate an example of how the reason prediction model may be trained, suppose that the machine learning training module 230 receives a set of training examples. In this example, the set of training examples may include attributes of previous orders placed by customers, such as a travel distance associated with servicing each order, a size of each order, a set of contextual features (e.g., a weather or traffic event, a holiday, etc.) associated with servicing each order, etc. In the above example, the set of training examples also may include attributes of the customers, such as a tip amount provided by each customer for a previous order, an amount by which each customer adjusted a suggested tip amount for a previous order, a number of orders previously placed by each customer, a region associated with each customer, an age of each customer's account with the online system 140, etc. In the above example, the machine learning training module 230 also may receive labels which represent expected outputs of the reason prediction model, in which a label indicates a reason provided by a customer for providing a tip amount or adjusting a suggested tip amount (e.g., included in comments, feedback, a response to a survey/questionnaire, etc. provided by the customer). Continuing with this example, the machine learning training module 230 may then train the reason prediction model based on the attributes as well as the labels by comparing its output from input data of each training example to the label for the training example.

The data store 240 stores data used by the online system 140. For example, the data store 240 stores customer data, item data, order data, and picker data, for use by the online system 140. As an additional example, the data store 240 may store preset messages that may be selected by the interface module 211. In this example, each preset message may include preset tip amounts, a suggested tip amount for servicing an order, one or more reasons the suggested tip amount is larger than an average tip amount a customer is likely to provide for servicing the order, one or more images, animations, icons, etc. describing the reason(s), general information describing tips (e.g., when they may be added or reduced and a percentage that is paid to pickers), etc. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
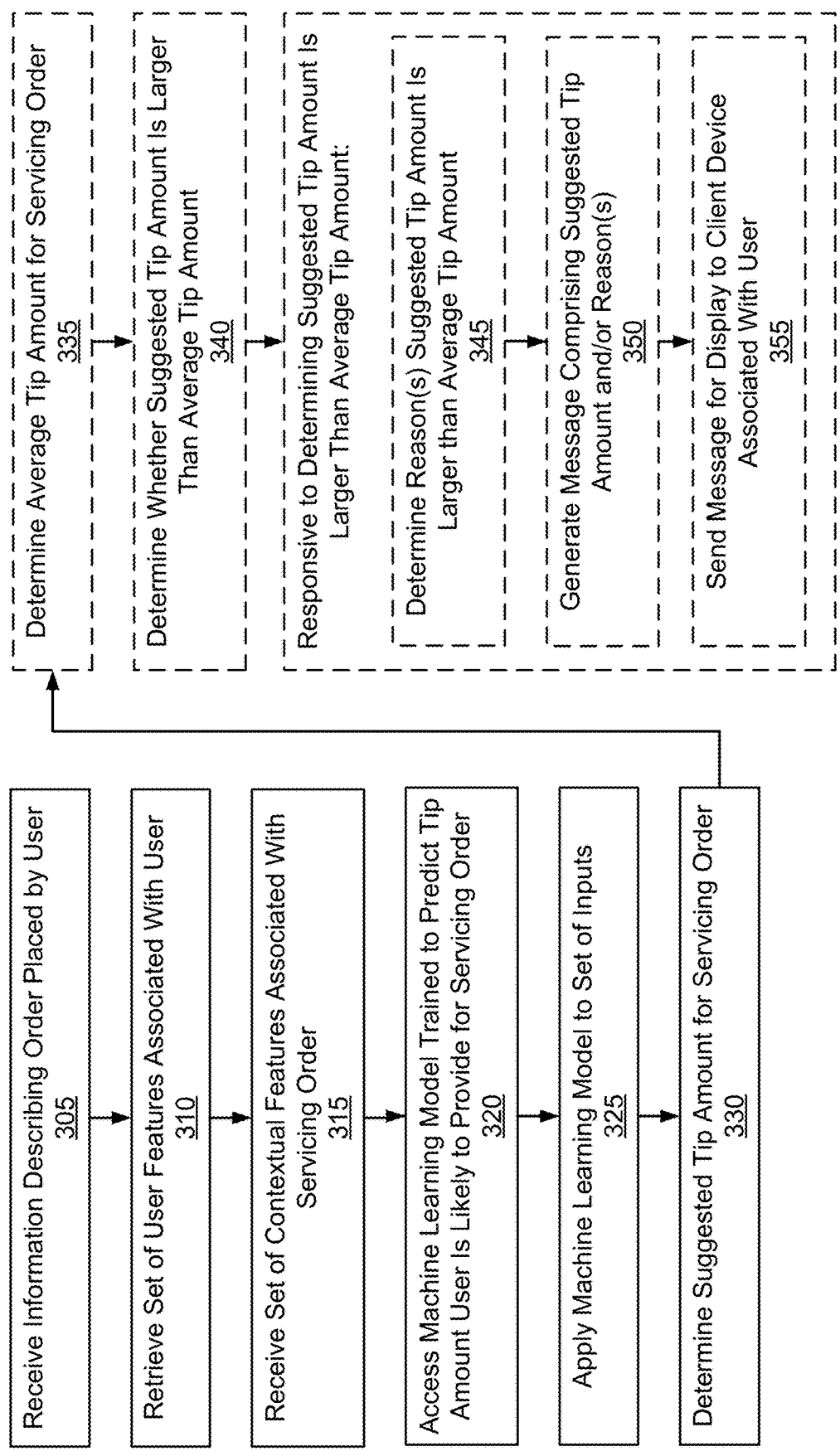
FIG. 3 is a flowchart of a method for determining a suggested tip amount for servicing an order placed with an online system, in accordance with one or more embodiments.

Determining a Suggested Tip Amount for Servicing an Order Placed with an Online System FIG. 3 is a flowchart of a method for determining a suggested tip amount for servicing an order placed with an online system 140, in accordance with one or more embodiments. Alternative embodiments may include more, fewer, or different steps from those illustrated in FIG. 3, and the steps may be performed in a different order from that illustrated in FIG. 3. These steps may be performed by an online system (e.g., online system 140), such as an online concierge system. Additionally, each of these steps may be performed automatically by the online system 140 without human intervention.

The online system 140 receives 305 (e.g., via the data collection module 200) information describing an order placed by a customer with the online system 140. The information describing the order may describe various characteristics of the order, such as item data for items included in the order, a size of the order (e.g., a number of items included in the order), a delivery location for the order, the customer associated with the order, a retailer location from which the customer wants the ordered items collected, or a timeframe within which the order is to be delivered. The information describing the order also may describe an amount of effort required to service the order, which may be determined (e.g., using the data collection module 200) based on other types of information (e.g., stored in the data store 240). For example, the information describing the order may describe a travel distance associated with servicing the order (e.g., between the retailer location and the delivery location), whether the retailer location or the delivery location includes stairs, whether the order includes heavy or bulky items, fees associated with servicing the order (e.g., for parking or tolls), etc.

The online system 140 then retrieves 310 (e.g., from the data store 240 using the tip prediction module 215) a set of customer features associated with the customer. The set of customer features may include various types of information, such as one or more tip amounts provided by the customer for one or more previous orders, one or more amounts by which the customer previously adjusted one or more suggested tip amounts, a number of orders previously placed by the customer with the online system 140, and an age of an account associated with the customer. The set of customer features further may include a region associated with the customer (e.g., based on a delivery location or an address associated with the customer), a frequency with which the customer places orders with the online system 140, a distribution of sizes of orders previously placed by the customer with the online system 140, or any other suitable types of information.

The online system 140 also receives 315 (e.g., via the data collection module 200) a set of contextual features associated with servicing the order. The set of contextual features associated with servicing the order may describe various circumstances or conditions that may affect a tip amount the customer provides for servicing the order. Examples of contextual features associated with servicing an order include: a weather event (e.g., heavy rain or snow) in which the order is to be serviced, a traffic event (e.g., heavy traffic, a road closure, etc.) along a route for servicing the order, a holiday (e.g., Christmas) during which the order is to be serviced, or any other suitable features. The online system 140 may receive 315 the set of contextual features associated with servicing the order from a third-party system (e.g., a third-party weather, traffic, or calendar application) or any other suitable source.

The online system 140 then predicts (e.g., using the tip prediction module 215) a tip amount the customer is likely to provide for servicing the order. The online system 140 may make the prediction based on various types of information, such as the information describing the order, the set of customer features associated with the customer, the set of contextual features associated with servicing the order, or any other suitable types of information. For example, suppose that the set of customer features associated with the customer describes previous orders placed by the customer with the online system 140 that often included the same five items collected from a retailer location and a tip amount of $2.00 for these orders. In this example, suppose also that information describing the order placed by the customer indicates that the order includes the same five items to be collected from the same retailer location and that the set of contextual features associated with servicing the order indicates that traffic conditions are light, the weather is mild, and it is not a holiday. In the above example, based on the information describing the order, the set of customer features associated with the customer, and the set of contextual features associated with servicing the order, the online system 140 may predict that the customer is likely to provide a tip amount of $2.00 for servicing the order. Alternatively, in the above example, suppose that the set of contextual features associated with servicing the order indicates that the weather is stormy and that the set of customer features indicates that the customer frequently provided an additional tip amount of $2.00 for previous orders that were serviced during stormy weather. In the above example, based on the information describing the order, the set of customer features associated with the customer, and the set of contextual features associated with servicing the order, the online system 140 may predict that the customer is likely to provide a tip amount of $4.00 for servicing the order. In some embodiments, the online system 140 predicts multiple tip amounts the customer is likely to provide for servicing the order based on different types of information (e.g., by including or excluding one or more contextual features associated with servicing the order when making each prediction).

In some embodiments, the online system 140 predicts the tip amount the customer is likely to provide for servicing the order using a tip prediction model, which is a machine learning model (e.g., a neural network, a random forest model, etc.) trained to predict the tip amount. To use the tip prediction model, the online system 140 may access 320 (e.g., using the tip prediction module 215) the model (e.g., from the data store 240) and apply 325 (e.g., using the tip prediction module 215) the model to a set of inputs. The set of inputs may include various types of information described above that the online system 140 may use to predict the tip amount (e.g., the information describing the order, the set of customer features associated with the customer, the set of contextual features associated with servicing the order, etc.). The online system 140 may then receive an output corresponding to the predicted tip amount that the customer is likely to provide for servicing the order. For example, the online system 140 may receive an output from the tip prediction model corresponding to a value (e.g., a percentage or a dollar value), in which the value describes the predicted tip amount that the customer is likely to provide for servicing the order. In some embodiments, rather than predicting a tip amount, the tip prediction model predicts a likelihood that the customer will provide a particular tip amount for servicing the order. In such embodiments, to use the tip prediction model, for each of multiple candidate tip amounts (e.g., 5%, 10%, 15%, etc.), the online system 140 applies 325 the model to the set of inputs to predict a likelihood that the customer will provide a corresponding candidate tip amount for servicing the order. The online system 140 may then receive, for each candidate tip amount, an output corresponding to a value (e.g., a score or a percentage) indicating a predicted likelihood that the customer will provide the corresponding candidate tip amount for servicing the order.

In some embodiments, the tip prediction model is trained by the online system 140 (e.g., using the machine learning training module 230). The online system 140 may train the tip prediction model based on historical data describing tip amounts provided by customers for previous orders placed by the customers via any suitable technique or combination of techniques (e.g., supervised learning, unsupervised learning, or reinforcement learning). To illustrate an example of how the tip prediction model may be trained, suppose that the online system 140 receives a set of training examples. In this example, the set of training examples may include attributes of previous orders placed by customers, such as a travel distance associated with servicing each order, a size of each order, a set of contextual features (e.g., a weather or traffic event, a holiday, etc.) associated with servicing each order, etc. In the above example, the set of training examples also may include attributes of the customers, such as a number of orders previously placed by each customer, a region associated with each customer, an age of each customer's account with the online system 140, a frequency with which each customer places orders, a distribution of sizes of orders previously placed by each customer, etc. Continuing with this example, the online system 140 also may receive labels which represent expected outputs of the tip prediction model, in which a label indicates a previous tip amount provided by a customer for servicing an order. In the above example, the online system 140 may then train the tip prediction model based on the attributes, as well as the labels by comparing its output from input data of each training example to the label for the training example. In this example, the online system 140 also may refine the tip prediction model via reinforcement learning based on information received in response to messages including suggested tip amounts for servicing previous orders (e.g., whether customers accepted suggested tip amounts and amounts by which customers adjusted suggested tip amounts, if any), as further described below.

In embodiments in which the online system 140 trains the tip prediction model, the online system 140 may address any cold start issues via a clustering algorithm that groups new and existing customers into one or more clusters (e.g., using customer embeddings or other representations of the customers), such that customers included in the same cluster share the same tipping behavior. For example, new and existing customers may be grouped via k-means clustering based on various customer features of the customers, such as a tip amount provided by each customer for a previous order, a number of orders previously placed by each customer, a region associated with each customer, an age of each customer's account with the online system 140, a distribution of sizes of orders previously placed by each customer, etc. In the above example, new customers may be grouped based on a region associated with each customer and regional averages (e.g., average tip amounts for previous orders provided by customers in the same region). Continuing with the above example, since customers included in the same cluster share the same tipping behavior, a different tip amount associated with each cluster may be determined (e.g., based on tip amounts previously provided by customers included in the cluster), in which the tip amount associated with a cluster indicates a tip amount a customer included in the cluster is likely to provide for servicing an order.

The online system 140 then determines 330 (e.g., using the tip determination module 216) a suggested tip amount for servicing the order. The online system 140 may do so based on the predicted tip amount the customer is likely to provide for servicing the order. For example, if the predicted tip amount the customer is likely to provide for servicing the order with a total cost of $34.96 is 5%, which is equivalent to $1.748, by rounding the tip amount to the nearest cent, the online system 140 may determine 330 the suggested tip amount for servicing the order to be $1.75. In embodiments in which the online system 140 predicts the likelihood that the customer will provide a particular tip amount for servicing the order for each of multiple candidate tip amounts, the online system 140 identifies (e.g., using the tip determination module 216) a candidate tip amount associated with a highest predicted likelihood and determines 330 the suggested tip amount based on the identified candidate tip amount. For example, if candidate tip amounts of 5%, 10%, 15%, 20%, and 25% are associated with predicted likelihoods of 17%, 39%, 23%, 12%, and 9%, respectively, the online system 140 may identify 10% as the candidate tip amount associated with the highest predicted likelihood and determine 330 the suggested tip amount for servicing the order to be 10%.

The online system 140 also may determine 330 the suggested tip amount for servicing the order based on additional types of information. Examples of such types of information include: whether a coupon code was applied to the order, preset tip amounts (if any), or any other suitable types of information. For example, suppose that the customer applies a coupon code to their order, which decreases a total cost for the order. In this example, if the predicted tip amount the customer is likely to provide for servicing the order is 10%, the online system 140 may determine 330 the suggested tip amount based on the original total cost for the order, such that the tip amount is 10% of the original total cost. As an additional example, if the predicted tip amount the customer is likely to provide for servicing the order is 9.284%, the online system 140 may identify a preset tip amount (e.g., 5%, 10%, 15%, 20%, etc.) closest to the predicted tip amount and determine 330 the suggested tip amount for servicing the order to be the identified preset tip amount (e.g., 10%).

In embodiments in which the online system 140 predicts multiple tip amounts the customer is likely to provide for servicing the order, the online system 140 also may determine 335 (e.g., using the tip determination module 216) an average tip amount the customer is likely to provide for servicing the order. The online system 140 may do so based on a predicted tip amount in a manner analogous to that described above for determining 330 the suggested tip amount. The average tip amount may differ from the suggested tip amount based on differences between one or more features (e.g., one or more contextual features associated with servicing the order) used to predict tip amounts on which the average and suggested tip amounts are based. For example, the average tip amount the customer is likely to provide for servicing the order may be smaller than the suggested tip amount for servicing the order if one or more contextual features associated with servicing the order (e.g., heavy rain or traffic, a holiday, etc.) used to predict the tip amount on which the suggested tip amount was based were not used to predict an additional tip amount on which the average tip amount was based. In embodiments in which the tip amount used to determine 330 the suggested tip amount and an additional tip amount used to determine 335 the average tip amount are predicted using the tip prediction model, to predict the additional tip amount, the model is applied 325 to a subset of the set of inputs used to predict the tip amount. For example, suppose that to predict the tip amount used to determine 330 the suggested tip amount, the online system 140 applies 325 the tip prediction model to the set of inputs including information describing the order, the set of customer features associated with the customer, and the set of contextual features associated with servicing the order. In this example, to predict the additional tip amount used to determine 335 the average tip amount, the online system 140 may apply 325 the model to a subset of the set of inputs that excludes one or more contextual features included among the set of contextual features associated with servicing the order. Continuing with this example, the online system 140 may then determine 335 the average tip amount based on the predicted additional tip amount.

The online system 140 also may determine 340 (e.g., using the tip reasoning module 217) whether the suggested tip amount is larger than the average tip amount. Furthermore, in response to determining 340 the suggested tip amount is larger, the online system 140 also may determine 345 (e.g., using the tip reasoning module 217) one or more reasons the suggested tip amount is larger than the average tip amount. The online system 140 may determine 345 the reason(s) based on differences between one or more features (e.g., one or more contextual features associated with servicing the order) used to predict tip amounts on which the average and suggested tip amounts are based. For example, suppose that the online system 140 compares the suggested tip amount with the average tip amount and determines 340 that the suggested tip amount is larger than the average tip amount. In this example, if a contextual feature associated with servicing the order (e.g., a traffic event) was used to predict the tip amount on which the suggested tip amount was based, but was not used to predict the additional tip amount on which the average tip amount was based, the online system 140 may determine 345 that the contextual feature is a reason for the difference.

In some embodiments, the online system 140 determines 345 the reason(s) the suggested tip amount is larger than the average tip amount using a reason prediction model, which is a machine learning model trained to predict the reason(s). To use the reason prediction model, the online system 140 may access (e.g., using the tip reasoning module 217) the model (e.g., from the data store 240) and apply (e.g., using the tip reasoning module 217) the model to a set of inputs. The set of inputs may include various types of information, such as information describing the order, the set of customer features associated with the customer, the set of contextual features associated with servicing the order, or any other suitable types of information. The online system 140 may then receive one or more outputs indicating the reason(s) the suggested tip amount is larger than the average tip amount (e.g., adverse weather conditions, a holiday, etc.).

In some embodiments, the reason prediction model may be trained by the online system 140 (e.g., using the machine learning training module 230). The online system 140 may train the reason prediction model via supervised learning based on various types of data received by the online system 140 (e.g., via the data collection module 200) and stored (e.g., in the data store 240), such as order data describing previous orders placed by customers, customer data describing the customers, or any other suitable types of information. To illustrate an example of how the reason prediction model may be trained, suppose that the online system 140 receives a set of training examples. In this example, the set of training examples may include attributes of previous orders placed by customers, such as a travel distance associated with servicing each order, a size of each order, a set of contextual features (e.g., a weather or traffic event, a holiday, etc.) associated with servicing each order, etc. In the above example, the set of training examples also may include attributes of the customers, such as a tip amount provided by each customer for a previous order, an amount by which each customer adjusted a suggested tip amount for a previous order, a number of orders previously placed by each customer, a region associated with each customer, an age of each customer's account with the online system 140, etc. In the above example, the online system 140 also may receive labels which represent expected outputs of the reason prediction model, in which a label indicates a reason provided by a customer for providing a tip amount or adjusting a suggested tip amount (e.g., included in comments, feedback, a response to a survey/questionnaire, etc. provided by the customer). Continuing with this example, the online system 140 may then train the reason prediction model based on the attributes as well as the labels by comparing its output from input data of each training example to the label for the training example.

Once the online system 140 determines 330 the suggested tip amount for servicing the order, the online system 140 may generate 350 (e.g., using the interface module 211) a message including the suggested tip amount. The message also may include additional types of content, such as text describing the reason(s) the suggested tip amount is larger than the average tip amount and additional tip amounts the customer may provide for servicing the order, one or more images, animations, or icons describing the reason(s), etc. The message also may include general information describing tips (e.g., when they may be added or reduced and a percentage that is paid to pickers), interactive elements (e.g., buttons) that allow the customer presented with the message to modify or select a tip amount that is different from the suggested tip amount, to save a tip amount, to place an order including a selected tip amount, or any other suitable types of content. The online system 140 may generate 350 the message using generative artificial intelligence (AI) or using any other suitable technique or combination of techniques. In some embodiments, rather than generating the message, the online system 140 selects (e.g., using the interface module 211) the message from a set of preset messages (e.g., stored in the data store 240).

Figure 4A:
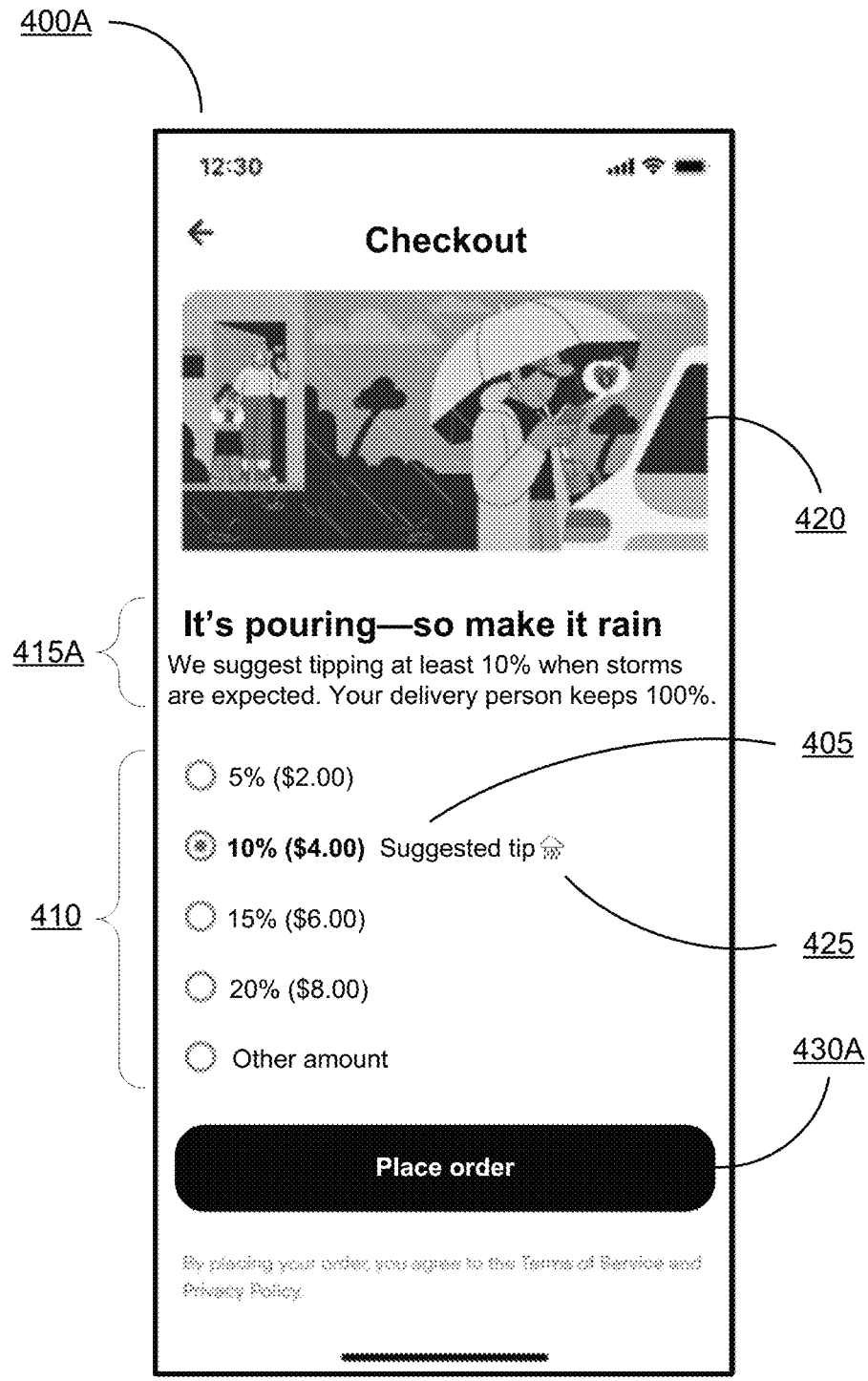
FIGS. 4A and 4B illustrate examples of messages including a suggested tip amount, in accordance with one or more embodiments.
Figure 4B:
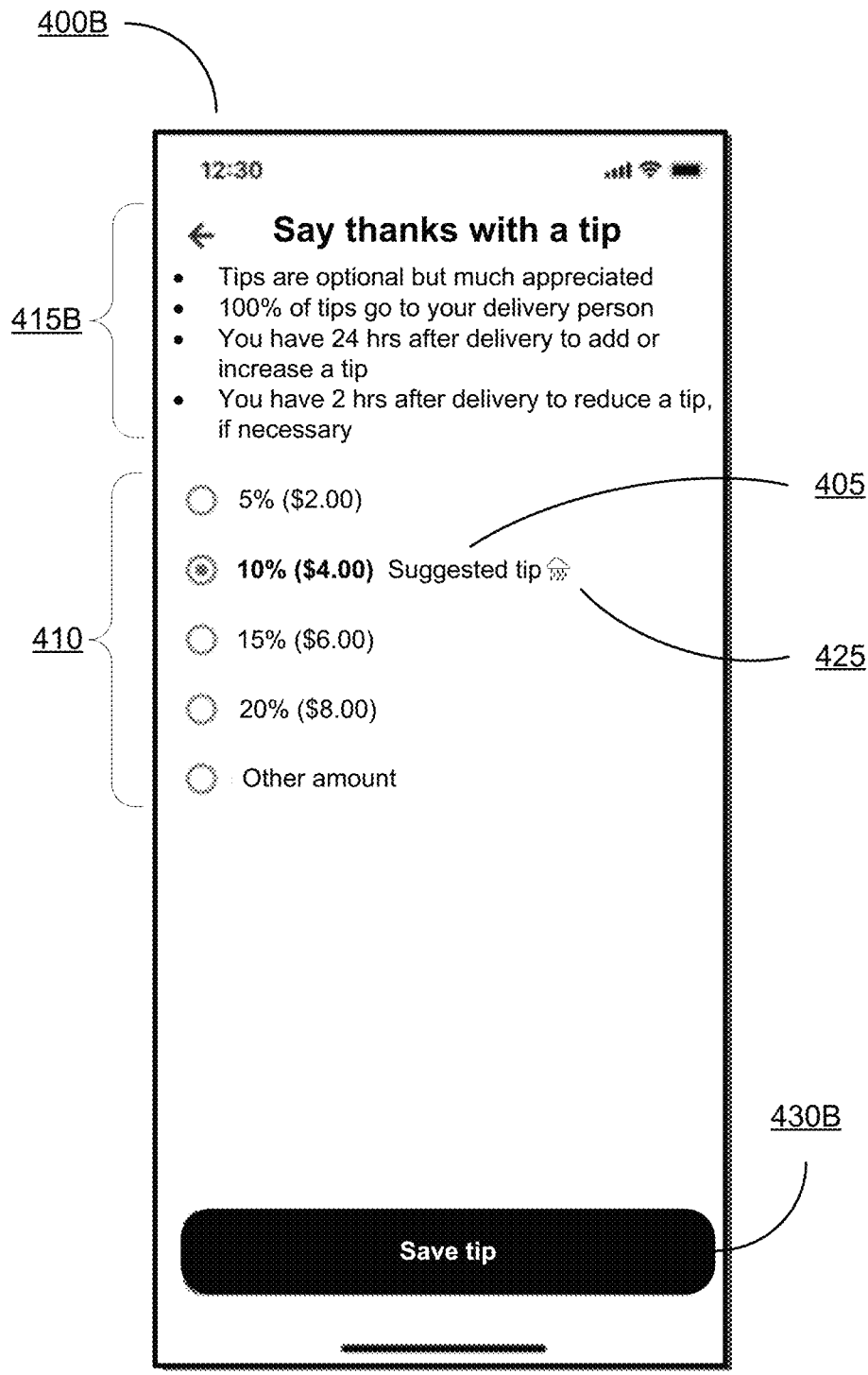

FIGS. 4A and 4B illustrate examples of messages 400 including a suggested tip amount, in accordance with one or more embodiments. Referring first to FIG. 4A, the message 400A may include the suggested tip amount of 10% ($4.00), which is preselected with an indication 405 that it is the suggested tip amount. In this example, the message 400A also may include options to select additional tip amounts 410 of 5% ($2.00), 15% ($6.00), 20% ($8.00), or another amount that the customer may specify upon selecting a radio button corresponding to that option. In the above example, the message 400A also may include text 415A describing a reason the suggested tip amount is larger than the average tip amount, such as stormy weather, and an image 420 or an icon 425 next to the suggested tip amount describing the reason. Continuing with the above example, the message 400A also may include an interactive element, such as a button 430A that allows the customer to place an order including the selected tip amount. As shown in the example of FIG. 4B, the message 400B also may include different or additional types of content, such as text 415B explaining general information about tips (e.g., when they may be added or reduced and a percentage that is paid to pickers) and a button 430B that allows the customer to save a selected tip amount.

In some embodiments, the message 400 may include a suggestion to increase a tip amount selected by the customer to the suggested tip amount. In such embodiments, the online system 140 generates 350 (or selects) the message 400 in response to receiving a request from a customer client device 100 associated with the customer to provide a tip amount that is smaller than the suggested tip amount. Furthermore, the message 400 may include one or more reasons for increasing the tip amount, which may correspond to the reason(s) the suggested tip amount is larger than the average tip amount. For example, suppose that the customer has selected a tip amount of 5% ($2.00) for servicing the order and that the suggested tip amount for servicing the order is 10% ($4.00). In this example, in response to receiving a request from the customer client device 100 associated with the customer to place the order including the selected tip amount or to save the selected tip amount, the online system 140 may generate 350 the message 400 including a suggestion to increase the tip amount selected by the customer (e.g., to the suggested tip amount of 10% ($4.00) or by $2.00) and the reason(s) for increasing the tip amount (e.g., it's a holiday and it's raining).

Referring back to FIG. 3, once the online system 140 generates 350 (or selects) the message 400 including the suggested tip amount or a suggestion to increase a tip amount selected by the customer to the suggested tip amount, it may send 355 (e.g., using the interface module 211) the message 400 for display to the customer client device 100 associated with the customer. The online system 140 subsequently may receive (e.g., via the interface module 211) a response to the message 400 from the customer client device 100. Information describing the response may be stored (e.g., in the data store 240 by the data collection module 200). For example, once the online system 140 generates 350 the message 400 including the suggested tip amount of 10% ($4.00) and sends 355 it for display to the customer client device 100 associated with the customer, the online system 140 subsequently may receive a response to the message 400 from the customer client device 100 indicating whether the customer accepted or adjusted the suggested tip amount. In this example, in association with customer data for the customer, the online system 140 may store information describing whether the customer adjusted the suggested tip amount, and if so, an amount by which it was adjusted. Information describing the response also may be used to retrain the tip prediction model or to refine the tip prediction model (e.g., via reinforcement learning). For example, the system may log user actions in response to suggested tip amounts (such as accepting the tip amount or selecting a different tip amount). The model can then be retrained with the user's acceptance of the suggestion as a label for whether the output of the model was correct, thereby continually improving the model over time as it is used in production.

Additional Considerations

The foregoing description of the embodiments has been presented for the purpose of illustration; a person of ordinary skill in the art would recognize that many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated with the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:
   receiving information describing an order placed by a user of an online system;
   retrieving a set of user features associated with the user;
   receiving a set of contextual features associated with servicing the order;
   accessing a first machine learning model trained to predict a tip amount the user is likely to provide for servicing the order, wherein the first machine learning model is trained by:
      receiving first historical data describing tip amounts provided by a plurality of users of the online system for previous orders placed by the plurality of users and first contextual data comprising a first set of contextual features describing contexts for serving the previous orders, and
      training the first machine learning model based at least in part on the first historical data;
   applying the first machine learning model to a first set of inputs to predict the tip amount the user is likely to provide for servicing the order, wherein the first set of inputs comprises the information describing the order placed by the user, the set of user features associated with the user, and a first subset of the received set of contextual features associated with servicing the order, wherein the first subset of the received set of contextual features correspond to the first set of contextual features;
   determining a suggested tip amount for servicing the order based at least in part on the predicted tip amount the user is likely to provide for servicing the order;
   accessing a second machine learning model trained to predict an average tip amount for servicing the order, wherein the second machine learning model is trained by:
      receiving second historical data describing tip amounts provided by a plurality of users of the online system for previous orders placed by the plurality of users and second contextual data comprising a second set of contextual features describing contexts for serving the previous orders, wherein the second set of contextual features comprises different features from the first set of contextual features; and
      training the second machine learning model based on the second historical data;
   applying the second machine learning model to a second set of inputs to predict an average tip amount for servicing the order, wherein the second set of inputs comprises the information describing the order placed by the user and the set of user features associated with the user and a second subset of the received set of contextual features associated with servicing the order, wherein the second subset of the received set of contextual features correspond to the second set of contextual features;

comparing the suggested tip amount to the average tip amount; and responsive to the suggested tip amount exceeding the average tip amount by a threshold:

identifying a contextual feature of the first subset of the received set of contextual features that is not in the second subset of the received set of contextual features, wherein identifying the contextual feature comprises applying a reason prediction model to the received set of contextual features and the set of user features, wherein the reason prediction model is a machine-learning model trained based on a plurality of training examples to predict which of the received set of contextual features caused a difference between a suggested tip amount and an average tip amount; and transmitting a user interface for display to the user of the online system through a client device associated with the user, wherein the user interface comprises the suggested tip amount and a reason for the suggested tip amount based on the identified contextual feature.

2. The method of claim 1, further comprising:
receiving a response from the client device associated with the user; and
retraining the first machine learning model to predict the tip amount the user is likely to provide for servicing the order based at least in part on the response.

3. The method of claim 1, wherein applying the first machine learning model to the first set of inputs to predict the tip amount the user is likely to provide for servicing the order comprises:
for each of a plurality of candidate tip amounts, applying the first machine learning model to the first set of inputs to predict a likelihood that the user will provide a corresponding candidate tip amount for servicing the order.

4. The method of claim 1, wherein training the first machine learning model based at least in part on the first historical data comprises:
grouping the plurality of users into one or more clusters based at least in part on the set of user features associated with the plurality of users; and
determining, based at least in part on the first historical data, a tip amount associated with each cluster of the one or more clusters that each user included in a corresponding cluster is likely to provide for servicing an order.

5. The method of claim 1, wherein the set of contextual features associated with servicing the order comprises one or more of: a weather event, a traffic event, or a holiday.

6. The method of claim 1, wherein the set of user features associated with the user comprises one or more of: one or more previous tip amounts provided by the user, one or more amounts by which the user previously adjusted one or more suggested tip amounts, a number of orders previously placed by the user with the online system, a region associated with the user, an age of a user account associated with the user, a frequency with which the user places orders with the online system, or a distribution of sizes of orders previously placed by the user with the online system.

7. The method of claim 1, wherein the information describing the order placed by the user comprises one or more of: a size of the order placed by the user or a travel distance associated with servicing the order.

8. A computer program product comprising a non-transitory computer-readable storage medium having instructions encoded thereon that, when executed by a processor, cause the processor to perform steps comprising:
receiving information describing an order placed by a user of an online system;
retrieving a set of user features associated with the user;
receiving a set of contextual features associated with servicing the order;
accessing a first machine learning model trained to predict a tip amount the user is likely to provide for servicing the order, wherein the first machine learning model is trained by:
receiving first historical data describing tip amounts provided by a plurality of users of the online system for previous orders placed by the plurality of users and first contextual data comprising a first set of contextual features describing contexts for serving the previous orders, and
training the first machine learning model based at least in part on the first historical data;
applying the first machine learning model to a first set of inputs to predict the tip amount the user is likely to provide for servicing the order, wherein the first set of inputs comprises the information describing the order placed by the user, the set of user features associated with the user, and a first subset of the received set of contextual features associated with servicing the order, wherein the first subset of the received set of contextual features correspond to the first set of contextual features;
determining a suggested tip amount for servicing the order based at least in part on the predicted tip amount the user is likely to provide for servicing the order;
accessing a second machine learning model trained to predict an average tip amount for servicing the order, wherein the second machine learning model is trained by:
receiving second historical data describing tip amounts provided by a plurality of users of the online system for previous orders placed by the plurality of users and second contextual data comprising a second set of contextual features describing contexts for serving the previous orders, wherein the second set of contextual features comprises different features from the first set of contextual features; and
training the second machine learning model based on the second historical data;
applying the second machine learning model to a second set of inputs to predict an average tip amount for servicing the order, wherein the second set of inputs comprises the information describing the order placed by the user and the set of user features associated with the user and a second subset of the received set of contextual features associated with servicing the order, wherein the second subset of the received set of contextual features correspond to the second set of contextual features;
comparing the suggested tip amount to the average tip amount; and
responsive to the suggested tip amount exceeding the average tip amount by a threshold:

identifying a contextual feature of the first subset of the received set of contextual features that is not in the second subset of the received set of contextual features, wherein identifying the contextual feature comprises applying a reason prediction model to the received set of contextual features and the set of user features, wherein the reason prediction model is a machine-learning model trained based on a plurality of training examples to predict which of the received set of contextual features caused a difference between a suggested tip amount and an average tip amount; and transmitting a user interface for display to the user of the online system through a client device associated with the user, wherein the user interface comprises the suggested tip amount and a reason for the suggested tip amount based on the identified contextual feature.

9. The computer program product of claim 8, wherein the computer-readable storage medium further has instructions encoded thereon that, when executed by the processor, cause the processor to perform steps comprising:

receiving a response from the client device associated with the user; and retraining the first machine learning model to predict the tip amount the user is likely to provide for servicing the order based at least in part on the response.

10. The computer program product of claim 8, wherein applying the first machine learning model to the first set of inputs to predict the tip amount the user is likely to provide for servicing the order comprises:

for each of a plurality of candidate tip amounts, applying the first machine learning model to the first set of inputs to predict a likelihood that the user will provide a corresponding candidate tip amount for servicing the order.

11. The computer program product of claim 8, wherein training the first machine learning model based at least in part on the first historical data comprises:

grouping the plurality of users into one or more clusters based at least in part on the set of user features associated with the plurality of users; and determining, based at least in part on the first historical data, a tip amount associated with each cluster of the one or more clusters that each user included in a corresponding cluster is likely to provide for servicing an order.

12. The computer program product of claim 8, wherein the set of contextual features associated with servicing the order comprises one or more of: a weather event, a traffic event, or a holiday.

13. The computer program product of claim 8, wherein the set of user features associated with the user comprises one or more of: one or more previous tip amounts provided by the user, one or more amounts by which the user previously adjusted one or more suggested tip amounts, a number of orders previously placed by the user with the online system, a region associated with the user, an age of a user account associated with the user, a frequency with which the user places orders with the online system, or a distribution of sizes of orders previously placed by the user with the online system.

14. A computer system comprising:
a processor; and
a non-transitory computer-readable storage medium storing instructions that, when executed by the processor, perform actions comprising:

receiving information describing an order placed by a user of an online system;

retrieving a set of user features associated with the user;

receiving a set of contextual features associated with servicing the order;

accessing a first machine learning model trained to predict a tip amount the user is likely to provide for servicing the order, wherein the first machine learning model is trained by:

receiving first historical data describing tip amounts provided by a plurality of users of the online system for previous orders placed by the plurality of users and first contextual data comprising a first set of contextual features describing contexts for serving the previous orders, and training the first machine learning model based at least in part on the first historical data;

applying the first machine learning model to a first set of inputs to predict the tip amount the user is likely to provide for servicing the order, wherein the first set of inputs comprises the information describing the order placed by the user, the set of user features associated with the user, and a first subset of the received set of contextual features associated with servicing the order, wherein the first subset of the received set of contextual features correspond to the first set of contextual features;

determining a suggested tip amount for servicing the order based at least in part on the predicted tip amount the user is likely to provide for servicing the order;

accessing a second machine learning model trained to predict an average tip amount for servicing the order, wherein the second machine learning model is trained by:

receiving second historical data describing tip amounts provided by a plurality of users of the online system for previous orders placed by the plurality of users and second contextual data comprising a second set of contextual features describing contexts for serving the previous orders, wherein the second set of contextual features comprises different features from the first set of contextual features; and training the second machine learning model based on the second historical data;

applying the second machine learning model to a second set of inputs to predict an average tip amount for servicing the order, wherein the second set of inputs comprises the information describing the order placed by the user and the set of user features associated with the user and a second subset of the received set of contextual features associated with servicing the order, wherein the second subset of the received set of contextual features correspond to the second set of contextual features;

comparing the suggested tip amount to the average tip amount; and responsive to the suggested tip amount exceeding the average tip amount by a threshold:

identifying a contextual feature of the first subset of the received set of contextual features that is not in the second subset of the received set of contextual features, wherein identifying the contextual feature comprises applying a reason prediction model to the received set of contextual features and the set of user features, wherein the reason prediction model is a machine-learning model trained based on a plurality of training examples to predict which of the received set of contextual features caused a difference between a suggested tip amount and an average tip amount; and
transmitting a user interface for display to the user of the online system through a client device associated with the user, wherein the user interface comprises the suggested tip amount and a reason for the suggested tip amount based on the identified contextual feature.

\* \* \* \* \*